May 28, 1929.  J. STROBLE  1,715,256
GRAIN VENTILATOR
Filed May 11, 1927
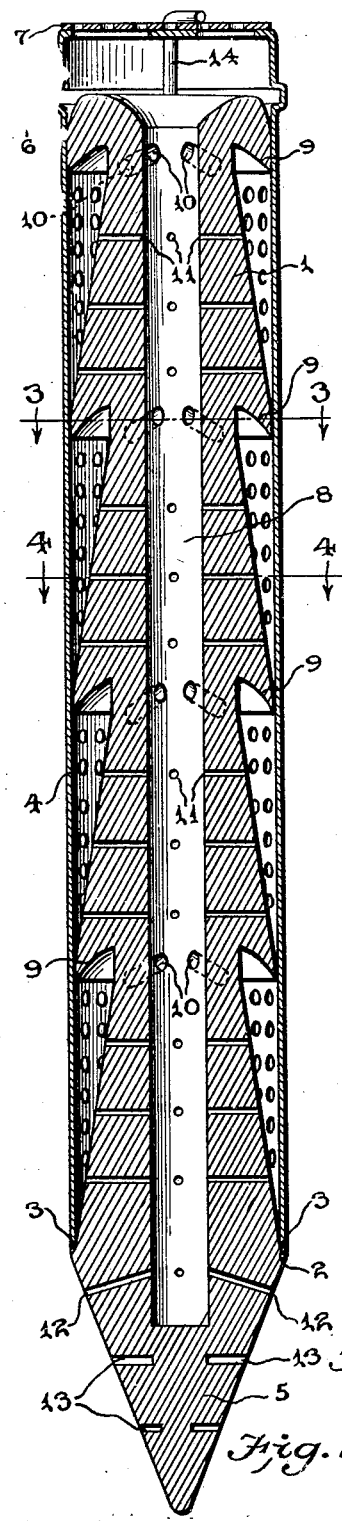
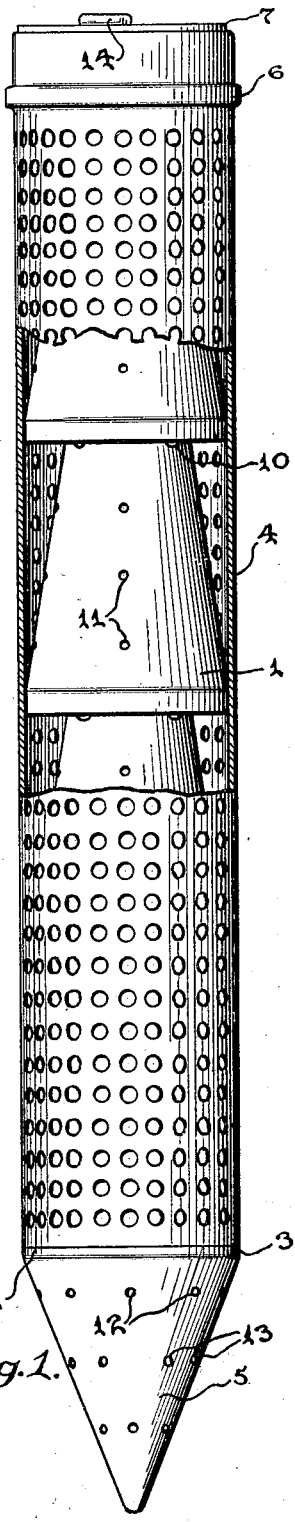
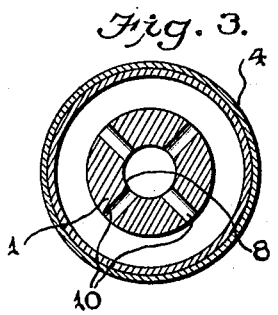
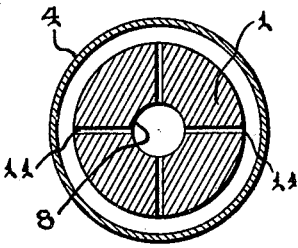
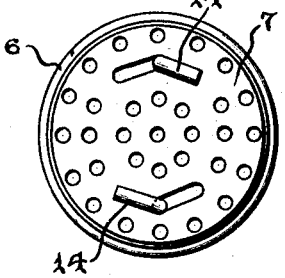
INVENTOR
John Stroble
BY
ATTORNEYS Patented May 28, 1929.

1,715,256

UNITED STATES PATENT OFFICE.

JOHN STROBLE, OF SEWARD, KANSAS; ELLA STROBLE ADMINISTRATRIX OF SAID JOHN STROBLE, DECEASED.

GRAIN VENTILATOR.

Application filed May 11, 1927. Serial No. 190,638.

This invention relates to so-called "grain ventilators" or devices or constructions inserted or imbedded in the storage grain bins to maintain the grain stored therein against deterioration through mold, etc. There are conditions, however, under which mere ventilation will not suffice to remove an excess of moisture which would injuriously affect the stored grain. To meet these conditions is the object of the present invention.

In attaining the object recited, I employ a combined ventilating and moisture absorbing medium, which in one specific embodiment herein described and illustrated may also be employed as a grain tester.

To this end, therefore, the invention resides in the novel construction and arrangement of parts described in the following detailed specification and illustrated in the accompanying drawings forming part thereof, and in which:

Figure 1 is a view in elevation of the parts broken away of a combined ventilator and drier constructed in accordance with the invention, Figure 2 is a longitudinal vertical section thereof, Figures 3 and 4 are horizontal sections taken, respectively, on lines 3—3 and 4—4 of Figure 2 and illustrating the arrangement and cooperation of the central longitudinally extending major air passage and of the lateral passages extending from the central passage outwardly, and, Figure 5 is a top plan view of the ventilator illustrating the manner in which the moisture absorbing cylinder is detachably locked within the outer protecting casing.

Referring to the drawings by numerals, 1 indicates an elongated body of any suitable moisture absorbing material; which may be of one of the soft woods, such as white pine which has an affinity for moisture, or it may be of more varied and different substances such as some of the clays which when moulded or baked have a distinct affinity for water. This body as will be seen, may be used alone without a protecting casing, the nature of the material comprising the body, determining the necessity, or lack of necessity, of the protective casing in the event a casing is used. The lower end of the body 1 is provided with a pointed nose 5 and at a point above said nose is provided with a shoulder 2 against which the lower end 3 of a foraminous cylinder 4 rests, the upper end of the cylinder, preferably having an annular enlargement 6 forming a hand grip or hold and a slotted top closed by a perforated disc 7 likewise slotted to receive said locking hooks hereinafter described.

When the moisture absorbing body is thus inclosed, its nose portion 5 is in direct contact with the grain in which the device is imbedded. When used without the casing, of course, the entire surface of the moisture absorbing body is in contact with the grain. This body is therefore additionally made self-ventilating. To this end the body is cored centrally and longitudinally providing a major centrally disposed longitudinal air passage 8, the lower end of which, within the nose portion 5 is closed. This central air passage may, under certain conditions, where internal strength is desired, be lined with a metal tube perforated appropriately to align with a plurality of communicating laterals or laterally extending air passages entering from the exterior of the body 1.

This body is shaped to provide a maximum area of moisture absorbing surface and as disclosed herein and preferably employed, provides an elongated cylindrical body presenting a terraced appearance by reason of a plurality of under-cut shoulders 9 forming hoods, the intermediate surface between the hoods tapering outwardly from the inner edge of the hood to the outer edge of the next adjacent hood. At the point where these hoods are curved, a plurality of lateral passages 10 extending from the outside of the cylinder 1 beneath the hoods to within the central air passage 8 and between these passages and the next adjacent hood, a plurality or series of smaller or minor air passages 11 are similarly formed. At the base of the central air passage 8, laterals 12 communicate and therebelow, short laterals 13 are preferably formed at the nose extremity of the absorbing cylinder 1.

The cylinder 1 at its upper end is open and at the opposite sides of this opening are hooks 14 extending upwardly, their ends being bent in reverse directions and extending through the slotted upper end of the casing, a partial rotation of the inner cylinder 1 projecting the bent ends of the hooks over the central portions of the casing and detachably locking the cylinder within the casing.

Preferably the upper end of the cylinder is protected against the entrance of grain to clog the central air passages and laterals accordingly, the disc 7 hereinbefore referred to is provided with many fine perforations for this purpose.

When the inner moisture absorbing cylinder 1 is used without a protecting casing, a similar disc 7 may be used at its upper end fastened thereon by appropriate means. It will be obvious that this cylinder can be used as a grain tester by removing the upper disc and dropping the cylinder into the grain bin to be tested, the cylinder being subsequently withdrawn with the central passage 8 thereof containing a sample of the grain within the interior of the bin, whose conditions can then be ascertained. In the use of the moisture absorbing cylinder by itself—that is without a protective metal casing, the shoulders or hoods 9 are a distinct advantage in reducing the resistance to withdrawal of the cylinder from the wheat bins and in pocketing the wheat or other grain close to the hoods to absorb a maximum amount of moisture therefrom when inserted in the bins.

While in illustrating one form of the invention, I have, of course disclosed a specific and preferred form, it is to be understood that variations both of material and construction is possible within the spirit of the invention and the scope of the appended claims.

I claim:

1. A grain ventilator and drier providing an elongated member having a bore providing an internal air passage extending longitudinally thereof from its upper end to a point adjacent to but above its lower end and having a plurality of lateral air passages extending through said member from its internal bore to its external surface, the material of said member forming the sides of said longitudinal bore and lateral passages being of a moisture absorbing nature, and a protective foraminous casing enclosing said elongated member.

2. A grain ventilator and drier providing an elongated member of moisture absorbing material having a central bore providing an internal air passage extending longitudinally thereof from its upper end to a point adjacent to but above its lower end, and having a plurality of lateral air passages of smaller size extending through said member from its internal bore to its external surface, a foraminous tubular casing enclosing said member and having its upper end provided with a detachable closure removable to permit the use of said elongated member as a tester, the central bore of said member forming a grain collecting pocket.

3. A grain ventilator and drier comprising an elongated inner body of moisture absorbing material having its lower end formed as a penetrating nose and having a major substantially central air passage extending longitudinally thereof and permanently closed at its lower end above said nose, a perforated outer tubular casing, a removable perforated closure for the upper end of said casing, and a plurality of minor lateral passages communicating with the perforations of said casing and with the said central passage throughout substantially the entire length of said passage.

4. A grain ventilator and drier providing an elongated body of moisture absorbing material having a central longitudinally extending air passage therein with communicating laterals and formed exteriorly with a plurality of under-cut shoulders forming hoods, the intermediate surfaces tapering outwardly from the undercut inner edge of said hood portions and having said communicating lateral passages extending therethrough.

5. A grain ventilator and drier providing an elongated body of moisture absorbing material having a pointed nose at its base, an internal bore extending longitudinally thereof from its upper end to a point above its base, and a plurality of communicating passages extending laterally therethrough from said bore to the exterior surface of said member, and a perforated tubular protective casing enclosing said member having a closed lower end and a detachable closure at its upper end.

6. A grain ventilator and drier providing an elongated body of moisture absorbing material having a pointed nose at its base and a central longitudinal air passage with communicating laterals, said body having a terraced exterior providing a longitudinal series of outwardly flaring skirted portions spanned by said lateral ventilating openings.

JOHN STROBLE.